A. B. SEPPMANN.
CARBON SCRAPER.
APPLICATION FILED MAY 5, 1921.
1,388,489.  Patented Aug. 23, 1921.
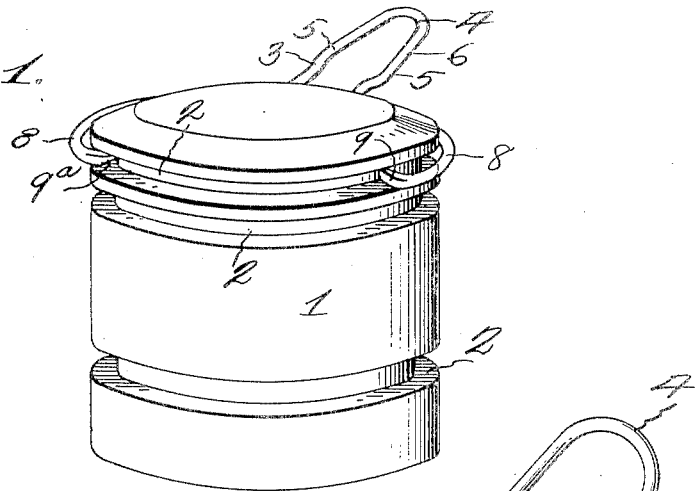
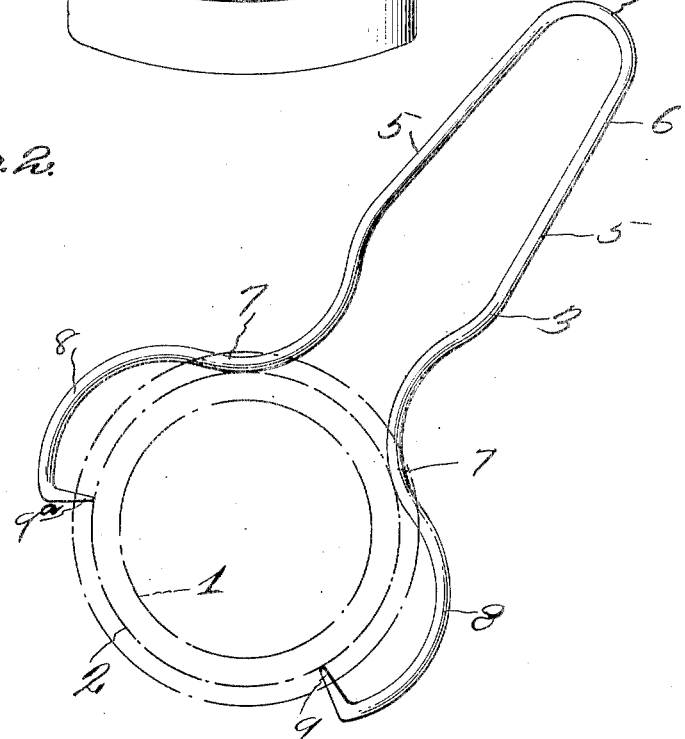
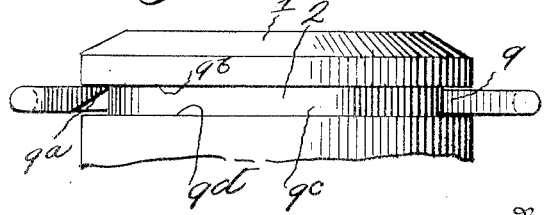
Inventor
A. B. Seppmann
By
Attorney

UNITED STATES PATENT OFFICE.

ALFRED BRUNO SEPPMANN, OF LAKE CRYSTAL, MINNESOTA.

CARBON-SCRAPER.

1,388,489. Specification of Letters Patent. Patented Aug. 23, 1921.

Application filed May 5, 1921. Serial No. 467,161.

*To all whom it may concern:*

Be it known that I, ALFRED BRUNO SEPPMANN, a citizen of the United States, residing at Lake Crystal, in the county of Blue Earth, State of Minnesota, have invented a new and useful Carbon-Scraper; and I do hereby declare the following to be a full, clear, and exact description of the invention, such as will enable others skilled in the art to which it appertains to make and use the same.

The invention relates to carbon scrapers for scraping and removing carbon from piston ring grooves of pistons used in internal combustion engines. Carbon forms and collects in piston ring grooves under the piston rings, in which grooves the piston rings have considerable clearance under them to allow the rings to follow the bore of the cylinder freely. Carbon will find its way by the rings and will form in the bottom of the grooves gradually filling them in, sometimes filling in more on one side than the other, which causes the ring to crowd to that side of the cylinder and as the carbon becomes very hard especially in the upper ring, and as the rings are not the same thickness throughout their circumference they tend to work around in their grooves, finally becoming wedged between the cylinder wall and the carbon formation under the ring. The wedging of the piston ring causes the ring to score the walls of the cylinder as the piston plays or reciprocates against the scored walls, and it also becomes scored. Therefore, it is the main object of the invention to provide a tool by means of which the carbon formation may be quickly and easily removed from the piston ring grooves.

A further object is to provide a carbon remover for removing carbon from piston ring grooves, said remover comprising a handle member formed from spring wire, which handle member is substantially U-shaped and has its arms bent inwardly toward each other, forming groove-receiving portions and then outwardly and inwardly and terminating in scraping members adapted to be received by the groove at points beyond a center line of the piston drawn at a right angle to the handle member; one of said scraping members being positioned to scrape the horizontal walls of the grooves and the other member positioned to scrape the vertical walls.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a perspective view of the conventional form of piston showing the carbon remover applied thereto.

Fig. 2 is a top plan view of the carbon remover showing the same in position on a piston.

Fig. 3 is a front elevation of a portion of a piston showing the scraper thereon.

Referring to the drawings, the numeral 1 designates a conventional form of internal combustion piston and 2 piston ring grooves disposed therein. Carbon collects in the piston grooves 2 and accumulates to such an extent as to crowd the piston ring to one side or the other, or to wedge the ring against circumferential movement. When this happens the bore of the cylinder becomes vertically scored or the piston is scored. When the bore or piston is so damaged loss of compression results and consequently the efficiency of the engine is impaired. To overcome these difficulties, a carbon removing tool 3 is provided, by means of which tool the carbon may be quickly and easily scraped from the walls of the piston ring grooves 2.

The carbon removing tool 3 is formed from a single piece of spring rod bent upon itself as at 4 to form the arms 5 which at one end constitutes the handle member 6, which handle member is adapted to be grasped by the hand of the operator for rotating or reciprocating the tool as a whole during a carbon removing operation. The arms 5 curve inwardly and outwardly, thereby forming portions 7, which portions are received within the piston ring groove 2 that is being cleaned and form means for guiding the tool during its rotation or reciprocation and preventing wobbling of the tool, thereby insuring a uniform scraping action. The arms 5 beyond the portion 7 extend outwardly and inwardly as at 8 and terminate in inwardly extending substantially radially disposed scraping arms 9 and 9ª, which arms engage in the groove 2 and scrape the walls thereof when the tool as a whole is reciprocated. The arms 9 and 9ᵃ are preferably disposed when the tool is applied to a piston at points outside of a line drawn through the piston center at a right angle to the handle 6. By so positioning the scraping arms 9 and 9ᵃ, it will be seen that the tool will be maintained in position on the piston by the spring action thereof; also that the portions 7 of the arms 5 will be maintained within the groove 2 which is being cleaned for guiding the tool during its rotation or reciprocation.

By referring to Fig. 3 it will be seen that a scraper member 9ᵃ is disposed in a position for scraping the upper horizontal wall 9ᵇ simultaneously with the scraping of the vertical wall 9ᶜ by the scraping arm 9, therefore it will be seen that as the scraper as a whole is reciprocated or rotated that one of the horizontal walls will be scraped at the same time that the vertical wall 9ᶜ is scraped. When it is desired to scrape the lower horizontally disposed wall 9ᵈ of the piston groove 2, it will only be necessary to turn the tool over, which action will place the wall scraping arm 9ᵃ in engagement with the horizontally disposed wall 9ᵈ, at which time the tool is reciprocated or rotated, thereby scraping the carbon from the vertical wall and from the lower horizontal wall 9ᵈ.

From the above it will be seen that a carbon remover for a piston ring groove is provided, which is simple in construction and one formed from a single piece of spring material. Also that the operator may by squeezing the handle 6 increase the pressure of the scraping arms 9 and 9ᵃ on the walls of the grooves when so desired.

The invention having been set forth what is claimed as new and useful is:

1. A carbon scraper for scraping carbon from piston ring grooves of pistons, said scraper being formed from a single piece of spring material bent upon itself to form a U-shaped handle, the arms of said handle extending inwardly toward each other and forming portions adapted to be received by the piston ring grooves, said arms beyond the groove receiving portions extending outwardly and inwardly and terminating in scraping arms adapted to engage in the groove of the piston and scrape said groove upon a movement of the tool as a whole.

2. A carbon scraper for scraping carbon from piston ring grooves of pistons, said scraper being formed from spring material and comprising a handle member and spring arms, said spring arms extending outwardly and inwardly and terminating in scraping elements adapted to be received by the piston grooves at points beyond a diametrical line drawn at a right angle to the handle member, said spring arms being so bent as to provide curved portions adapted to be received by the piston groove adjacent the handle member.

3. A carbon scraper for scraping carbon from piston grooves of pistons, said scraper being formed from a single piece of spring material bent upon itself to form a U-shaped handle, the arms of said handle extending inwardly toward each other and forming portions adapted to be received by the groove of the piston, said arms beyond the groove receiving portions extending outwardly and inwardly and terminating in scraping arms adapted to engage in the groove, one of said scraping arms being provided with a horizontally disposed scraping edge adapted to scrape the horizontal walls of the groove and a vertically disposed scraping edge carried by the other scraping arm and adapted to scrape the vertical wall of the groove.

In testimony whereof I have signed my name to this specification in the presence of two subscribing witnesses.

ALFRED BRUNO SEPPMANN.

Witnesses:
T. K. MEAGHN,
A. E. QUIMBY.